Feb. 2, 1971 H. D. HARTZLER 3,560,409
SOLUTIONS OF METALLIC SILVER IN ISOCYANIDES
Filed Sept. 29, 1967
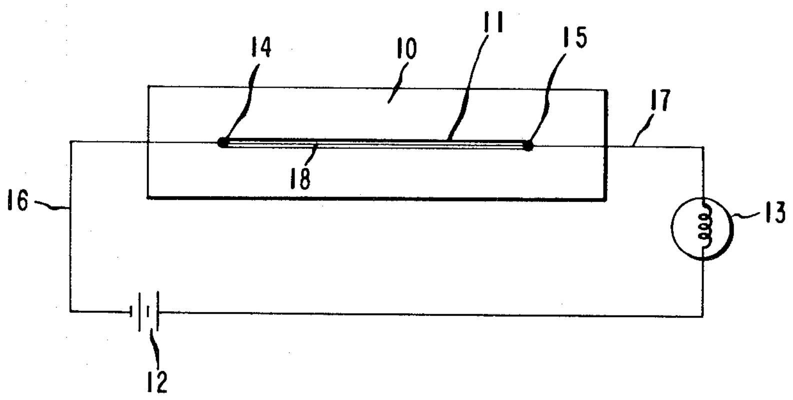
INVENTOR
HARRIS D. HARTZLER
BY James H. Ryan
ATTORNEY United States Patent Office 3,560,409
Patented Feb. 2, 1971

3,560,409
SOLUTIONS OF METALLIC SILVER IN ISOCYANIDES

Harris D. Hartzler, Wilmington, Del., assignor to E. I. du Pont de Nemours and Company, Wilmington, Del., a corporation of Delaware Filed Sept. 29, 1967, Ser. No. 671,823
Int. Cl. H01f *1/02;* C23c *3/00*
U.S. Cl. 252—514 10 Claims

ABSTRACT OF THE DISCLOSURE

Described are solutions of silver in isocyanides, e.g., cyclohexyl isocyanide, and the preparation thereof. The solutions are useful for making electrically conducting printed circuits at moderate temperatures.

FIELD OF THE INVENTION

This invention relates to, and has as its principal objects provision of, solutions of silver in isocyanides and the making of electrically conductive printed circuits from the solutions.

DESCRIPTION OF THE INVENTION

The isocyanides are a relatively small and relatively unexplored class of compounds which may be represented by the formula R—NC, R standing for any organic group stable when combined with the —NC radical. R—NC thus represents any isocyanide capable of independent existence.

In accordance with the present invention, it has been found that liquid isocyanides dissolve metallic silver at moderate to elevated temperatures to form electroconductive solutions of up to about 10% of the metal and that the silver can be readily recovered from the solution by simple evaporation of the solvent. It is not entirely certain how the silver is dissolved by the isocyanide, but it is believed that an isocyanide-soluble zero-valent silver complex of the probable formula $Ag(CNR)_2$ where R as above is formed on contact of the reactants. The complex then reverts to silver and isocyanide on standing in air or upon evaporation of solvent and complexing isocyanide. Since, however, the mechanism of dissolution of the silver and its state in the isocyanide are not exactly known, the homogeneous silver-isocyanide mixture obtained on reacting the silver and the isocyanide will be referred to herein simply as a "solution," although the silver complex may be the actual thing dissolved.

Because of availability, a preferred class of isocyanides for use in the invention comprises normally liquid isocyanides containing 2–13 carbon atoms. A more preferred class again because of availability, consists of isocyanides, RNC, in which the R group is hydrocarbyl free of ethylenic and acetylenic unsaturation, including alkyl, cycloalkyl, aryl, alkaryl and aralkyl. Most preferred, because of availability and because they are liquids at ordinary temperatures, are the lower alkyl and lower cycloalkyl (especially $C_5$ and $C_6$ cycloalkyl) isocyanides. In general, aliphatic isocyanides are preferred to aromatic isocyanides, since many of the latter are solids at ordinary temperatures. This consideration becomes less important when the process is carried out at elevated temperatures or in the presence of a cosolvent (see below).

Specific isocyanides usable in the invention as solvents and reactants are methyl isocyanide, ethyl isocyanide, isopropyl isocyanide, butyl isocyanide, isobutyl isocyanide, t-butyl isocyanide, hexyl isocyanide, octyl isocyanide, dodecyl isocyanide, cyclohexyl isocyanide, 3-dimethylaminopropyl isocyanide, 2-diethylaminoethyl isocyanide, phenyl isocyanide, benzyl isocyanide, o-, m-, and p-tolyl isocyanides, o-chlorophenyl isocyanide, and p-methoxyphenyl isocyanide. All these compounds are liquids at ordinary temperatures or are solids melting no higher than 33° C.

The principal requirement for the metallic silver is that it be finely divided, so that a high surface area can be exposed to the isocyanide. The exact method of preparation and history of the silver are apparently not critical (see Examples 1 and 5). Any form of silver, e.g., a single bar or plate, seems to be slowly dissolved; finely divided metal appears to be necessary if the process is to proceed at a practical rate.

The ratio of isocyanide to silver employed is not a critical variable, since undissolved silver can be removed at any time by filtration and any amount of isocyanide desired can be removed by evaporation. The starting weight ratio of isocyanide to silver generally employed is 2/1 to 100/1, with about 5/1 to 25/1 being preferred. Silver concentrations of about 10% by weight can be realized.

Inert cosolvents can also be present, and furthermore, can be present at the start of the process. Operable cosolvents include hydrocarbons free of ethylenic and acetylenic unsaturation, halohydrocarbons, and ethers. Examples are benzene, toluene, the xylenes, methylcyclopentane, cyclohexane, heptane, isooctane, chlorobenzene, 1,2-dichloroethane, butyl ether, tetrahydrofuran, 1,2-dimethoxyethane, dioxane, and 2-ethoxyethyl ether. For economic reasons, the hydrocarbons represent the preferred cosolvents. Cosolvent/solvent isocyanide ratios of up to about 3/1 are preferred (the ratio in Example 5, below, is slightly above 2/1).

Ordinary or ambient temperatures (20°–30° C., usually about 25° C.) are generally employed in the dissolution step. Lower temperatures can be used, but the rate of dissolution is lower, and some of the isocyanides freeze. Raising the temperature increases the rate of dissolution but also increases the rate of side reactions, such as trimerization or polymerization of the isocyanide. Even more important, the isocyanide-silver complex will decompose at some higher temperature, probably with reprecipitation of metallic silver. About 0°–100° C. is the broad range of operability for dissolution, 10°–50° C. is the preferred range, and ordinary, i.e., ambient, temperatures are convenient and most preferred.

The time required to achieve a given concentration of dissolved silver will depend on the state of subdivision of silver, the temperature, and on the particular isocyanide and amount of cosolvent, if any. In the Examples below, the dissolution time is from 2 to 7 days. A few hours is the lower limit and up to about 10 days is a preferred maximum.

A notable feature of the present silver solutions is the ease with which metallic silver can be recovered from them. It is only necessary that the isocyanide solvent and cosolvent be evaporated for the silver to be recovered in electrically conductive form. Printed circuits on any nonconductive base, e.g., ceramic, plastic, even paper or other, can thus readily be prepared at low temperatures. In some instances, also, bright silver plate is formed as on glass, producing mirrors.

EMBODIMENTS OF THE INVENTION

There follow some nonlimiting examples embodying features of the invention. In these examples, percentages are given in terms of weight, and temperatures, in degrees centigrade. Example 3 is a control showing that copper and gold do not dissolve under the conditions of the process of this invention.

EXAMPLE 1

Solution of silver in cyclohexyl isocyanide and its recovery

Finely dispersed silver was prepared according to the method of Gomberg and Cone [(Ber. 39, 3286 (1906))]. A mixture of five parts of the powdered silver with 50 parts of cyclohexyl isocyanide was stirred at 25° for 7 days. The mixture was filtered to recover 3.9 parts of undissolved silver, giving, by difference, a 2.2% solution. The clear, colorless filtrate was distilled under reduced pressure to recover the isocyanide. The residue was a dark powder. The major phase of this solid was identified as metallic silver by X-ray crystallographic analysis.

EXAMPLE 2

Solution of silver in t-butyl isocyanide

A small amount of silver powder in approximately 0.5 g. of t-butyl isocyanide was tumbled in a sealed glass tube for five days. The tube was opened and the contents were filtered. The clear, colorless filtrate was concentrated under reduced pressure. After removal of the liquid, there remained a white crystalline solid. Upon standing the solid darkened and formed a metallic film. This residue was dissolved in concentrated nitric acid. The solution was diluted with distilled water and a few drops of concentrated hydrochloric acid were added. This gave a white precipitate which was identified as silver chloride. The metal in the film was thus identified as silver.

EXAMPLE 3

Gold and copper with isocyanides (A) Finely divided gold was obtained by dissolving a commercial sample of gold in aqua regia, concentrating the solution, diluting the solution with water, and reducing the chloroauric acid with hydrazine to metallic gold. The gold powder was suspended in t-butyl isocyanide and agitated at room temperature for 5 days. The mixture was filtered, and the filtrate was evaporated to dryness. No residue was visible after removal of the solvent indicating that none of the gold had dissolved.

(B) A suspension of 5 parts of a commercial precipitated copper powder in 50 parts of cyclohexyl isocyanide was stirred for 8 days at 25°. The mixture was filtered to recover 4.8 parts of insoluble copper. The filtrate was concentrated under reduced pressure. A trace of yellow oil remained after removal of the isocyanide solvent, but there was no indication of metallic copper or any copper-containing material.

This example shows that gold and copper do not react with isocyanides under the same conditions as silver.

EXAMPLE 4

Electrical conductivity of silver dissolved in t-butyl isocyanide and recovered from solution A suspension of 5 parts of powdered silver in 31 parts of t-butyl isocyanide was stirred at room temperature for 4 days. The mixture was filtered to recover 2.6 parts of undissolved silver, with, by difference, a 7.2% solution being formed. The filtrate had an electrical resistance of $7 \times 10^3$ ohm (measured with a Simpson ohm-meter with probes 8 mm. apart). A comparable measurement on neat cyclohexyl isocyanide gave an electrical resistance of $9 \times 10^5$ ohm.

The filtrate was distilled under reduced pressure to remove the excess isocyanide. The residue was a white crystalline solid which rapidly decomposed forming a dark, metallic film. The electrical resistance of this film was less than one ohm.

This experiment demonstrates the utility of this system for the deposition of silver for electrical conduction.

EXAMPLE 5

Silver in cyclohexyl isocyanide with benzene as cosolvent and printed circuit prepared therefrom (A) Powdered silver was obtained from a commercial sample (DuPont, a suspension in butyl Cellosolve®, i.e., 2-butoxyethyl alcohol) by filtration and rinsing with acetone to remove the butyl Cellosolve®. The powdered silver (27) parts) was stirred with 880 parts of benzene and 420 parts of cyclohexyl isocyanide at room temperature for 2 days to give, by difference, a 1.7% solution. The mixture was filtered to give a clear, colorless filtrate. There was recovered 20 parts of silver which had not dissolved.

(B) A printed circuit as shown in the drawing was prepared from the filtrate of A. The filtrate was dropped onto a sheet of Delrin® polyacetal resin serving as a template 10 in which groove 11 was scored. The plastic was warmed slightly to facilitate evaporation of the solvent. After the solvent had evaporated, there remained a thin deposit 18 of silver in the groove of the plastic template. Measurement showed no electrical resistance along the prepared line.

Two flashlight batteries 12 and a flashlight bulb 13 were connected in series to terminals 14 and 15 of the deposited silver through connections 16 and 17. The circuit was completed and the bulb lighted.

This experiment shows the utility of the system for the formation of electrical circuits. It also shows that a cosolvent may be used with the isocyanide.

Since obvious modifications and equivalents will be evident to those skilled in the chemical arts, I propose to be bound solely by the appended claims.

The embodiments of the invention in which an exclusive property or privilege is claimed are defined as follows:

1. A solution of up to about 10% by weight of silver in a liquid organic isocyanide containing 2–13 carbon atoms.

2. A solution of claim 1 including a liquid cosolvent of the group consisting of hydrocarbons, halohydrocarbons and ethers free of ethylenic and acetylenic unsaturation, the liquid cosolvent to organic isocyanide ratio not exceeding 3/1.

3. A solution of claim 1 wherein the isocyanide is cyclohexyl isocyanide.

4. A solution of claim 1 wherein the isocyanide is t-butyl isocyanide.

5. The process of forming a solution of claim 1 which comprises contacting silver with a liquid organic isocyanide containing 2–13 carbon atoms at a temperature of about 0–100° C. and thereby forming a solution of the same containing up to about 10% by weight of silver.

6. The process of claim 5 wherein the silver is in finely divided form.

7. The process of claim 5 wherein the temperature is 10°–50° C.

8. The process of claim 5 wherein the isocyanide is cyclohexyl isocyanide.

9. The process of claim 5 wherein the isocyanide is t-butyl isocyanide.

10. The process of claim 5 wherein a liquid cosolvent is employed, said liquid cosolvent being of the group consisting of hydrocarbons, halohydrocarbons and ethers free of ethylenic and acetylenic unsaturation, and the liquid cosolvent to organic isocyanide ratio not exceeding 3/1.

References Cited

UNITED STATES PATENTS 2,922,737 1/1960 Moudry et al. ----- 252—313X

RICHARD D. LOVERING, Primary Examiner

U.S. Cl. X.R.

106—1; 117—227; 252—364; 260—430